United States Patent [19]
Neely

[11] Patent Number: 5,978,782
[45] Date of Patent: *Nov. 2, 1999

[54] NEURAL NETWORK SIGNAL PROCESSOR FOR MAGNETIC STORAGE CHANNELS

[75] Inventor: William Shields Neely, Campbell, Calif.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/676,057

[22] Filed: Jul. 5, 1996

[51] Int. Cl.$^6$ ................................................ G06F 15/18
[52] U.S. Cl. .............................................................. 706/16
[58] Field of Search ................................ 395/22; 360/46; 706/16

[56] References Cited

U.S. PATENT DOCUMENTS

| | | | |
|---|---|---|---|
| 5,594,597 | 1/1997 | Padden | 360/46 |
| 5,699,487 | 12/1997 | Richardson | 395/22 |

FOREIGN PATENT DOCUMENTS

| | | | |
|---|---|---|---|
| 0 491 301 A1 | 6/1992 | European Pat. Off. | G11B 11/14 |
| 0 498 574 A2 | 8/1992 | European Pat. Off. | G11B 20/22 |

OTHER PUBLICATIONS

Diegert, Out–of–core backpropagation, IJCNN, pp. 97–103, Jun. 21, 1990.

Coker et al., Implementation of PRML in a rigid disk drive, IEEE transactions on magnetics, pp. 4538–4543, Jun. 15, 1991.

Patel, A new digital signal processing channel for data storage products, IEEE Transactions on Magnetics, pp. 4579–4584, Jun. 15, 1991.

Cideciyan et al., A PRML system for digital magnetic recording, IEEE journal, pp. 38–56, Jan. 1992.

Lee, Neural Net equalization for a magnetic recording channel, Conference record of the 27th Asilomar conference on signals, systems and computers, pp. 369–374, Nov. 3, 1993.

Nair et al., Improved equalization for digital recording using non–linear filtering and error confinement, IEEE transactions on Magnetics, pp. 4221–4223, Jun. 23, 1994.

Nair, Modeling and simulation of advanced read channels, IEEE transactions on magnetics, pp. 4056–4058, Apr. 16, 1993.

Sapthotharan K. Nair and Jaekyun Moon, "Simplified Non-linear Equalizers", Transactions on Magnetics, vol. 31, No. 6, Nov. 1995, pp. 3051–3053.

*Primary Examiner*—Paul R. Lintz
*Assistant Examiner*—Sanjiv Shah
*Attorney, Agent, or Firm*—Limbach & Limbach L.L.P.

[57] ABSTRACT

A neural network based signal processor for a magnetic storage channel, such as a magnetic disk drive for a computer, uses a multiple layer perceptron neural network to perform the symbol sequencing detection, equalization and decoding of information signals retrieved from the magnetic storage medium.

14 Claims, 5 Drawing Sheets

NEURAL NETWORK SIGNAL PROCESSOR FOR MAGNETIC STORAGE CHANNELS

BACKGROUND OF THE INVENTION

1. Field of the Invention

The present invention relates to signal processors for processing information signals retrieved from a magnetic storage medium, and in particular, to neural network based signal processors for partial response maximum likelihood (PRML) read channels.

2. Description of the Related Art

Referring to FIG. 1, a conventional data storage and retrieval system which uses a magnetic disk includes a write channel and a read channel. Within the write channel, user data 9 is encoded by a data encoder 10 (e.g., with some form of run length limited code). The encoded data 11 is converted into a data symbol sequence by a data sequencer 12 (translating logic 0 bits to −1 and logic 1 bits to +1). The resulting data sequence 13 is stored on a magnetic disk 14d via the disk read/write electronics 14a, actuator arm 14b and read/write head 14c.

Within the read channel, the information signal 15 retrieved from the disk (via the read/write head 14c, actuator arm 14b and read/write circuit 14a) is filtered by a filter 16 and the filtered signal 17 is buffered by a gain controlled buffer amplifier 18. The buffered analog signal 19 is converted to a digital signal 21 by an analog-to-digital converter, or sampler, 20 and filtered by an equalizing filter 22. The equalized sample sequence 23 is used by a gain and timing control circuit 24 for controlling the gain of the buffer amplifier 18 via a gain control signal 25a and for controlling the sampler 20 via a sample control signal 25b. The equalized sample sequence 23 is also processed by a Viterbi detector 26 to determine the correct data sequence. This detected signal 27 is decoded by a data decoder 28 to provide the user data 29.

In such a conventional PRML read channel, a high sampling rate for the data is required to capture the signal samples, and with increasingly higher data retrieval rates such sample rates are now typically quite high. Accordingly, to keep up with such high speed data sampling, high speed hard wired digital signal processors (DSPs) must often be used.

Accordingly, it would be desirable to have a data read channel which avoids the need for high speed samplers and DSPs.

SUMMARY OF THE INVENTION

In accordance with one embodiment of the present invention, a neural network based processor for symbol sequencing detection, equalization and decoding of information signals retrieved from a magnetic storage medium includes a magnetic signal receiver and a neural network signal processor. The magnetic signal receiver is configured to receive an information signal originating from a magnetic storage medium and in accordance therewith provide a retrieved data signal which represents a first plurality of data stored on such magnetic storage medium. The first plurality of data includes encoding and symbol sequencing. The retrieved data signal also includes the encoding, the symbol sequencing and a plurality of nonlinearities. The plurality of nonlinearities corresponds to the originating of the information signal from the magnetic storage medium. The neural network signal processor is coupled to the magnetic signal receiver and is configured to receive and perform symbol sequencing detection, equalization and decoding upon the retrieved data signal and in accordance therewith provide a recovered data signal. The recovered data signal represents a second plurality of data which corresponds to the first plurality of data with the symbol sequencing detected, the encoding decoded and the plurality of nonlinearities substantially equalized.

In accordance with another embodiment of the present invention, a neural network system having a neural network based signal processor and configured to train such neural network based signal processor for symbol sequencing detection, equalization and decoding of information signals retrieved from a magnetic storage medium includes a data source, a magnetic storage medium model, an additive noise source, a neural network signal processor and an error detection circuit. The data source is configured to provide a first plurality of data which includes encoding and symbol sequencing. The magnetic storage medium model is coupled to the data source, represents a reference magnetic storage medium and is configured to receive and process the first plurality of data and in accordance therewith provide a first data signal which represents the first plurality of data. The first data signal includes the encoding, the symbol sequencing and a plurality of nonlinearities. The plurality of nonlinearities corresponds to an originating of the first data signal from the reference magnetic storage medium. The additive noise source is coupled to the magnetic storage medium model and is configured to receive the first data signal and add noise thereto and in accordance therewith provide a second data signal. The second data signal includes the encoding, the symbol sequencing, the plurality of nonlinearities and the added noise. The neural network signal processor is coupled to the additive noise source and is configured to receive and back propagate an error signal and in accordance therewith receive and perform symbol sequencing detection, equalization and decoding upon the second data signal and in accordance therewith provide a third data signal. The third data signal represents a second plurality of data which corresponds to the first plurality of data with the symbol sequencing detected, the encoding decoded, the plurality of nonlinearities substantially equalized and the added noise substantially removed. The error detection circuit is coupled to the magnetic storage medium model and the neural network signal processor and is configured to receive and process the first and third data signals and in accordance therewith provide the error signal.

These and other features and advantages of the present invention will be understood upon consideration of the following detailed description of the invention and the accompanying drawings.

DETAILED DESCRIPTION OF THE INVENTION

Figure 1:
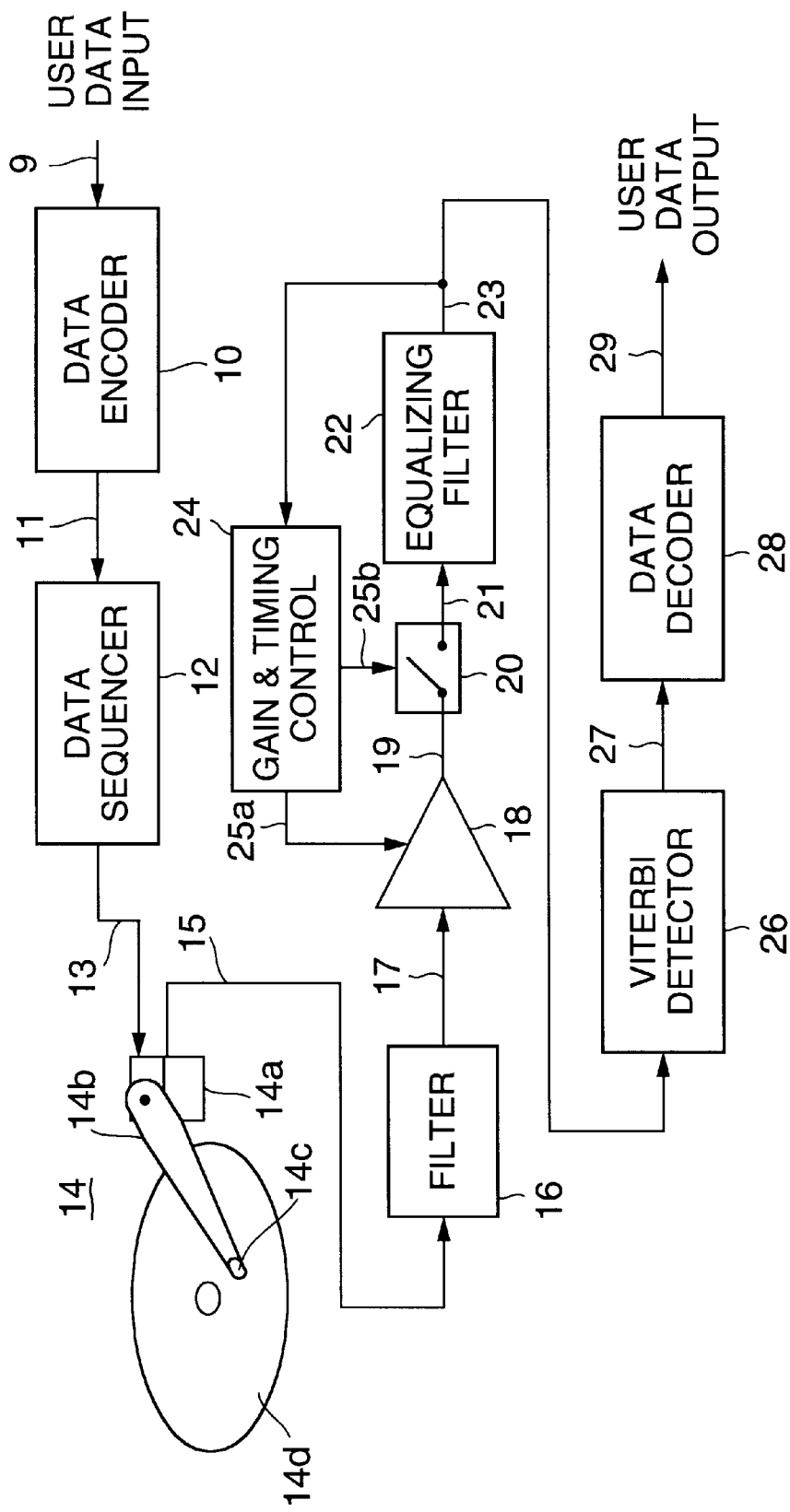
FIG. 1 is a functional block diagram of a conventional data storage and retrieval system using a magnetic disk and a PRML read channel.
Figure 2:
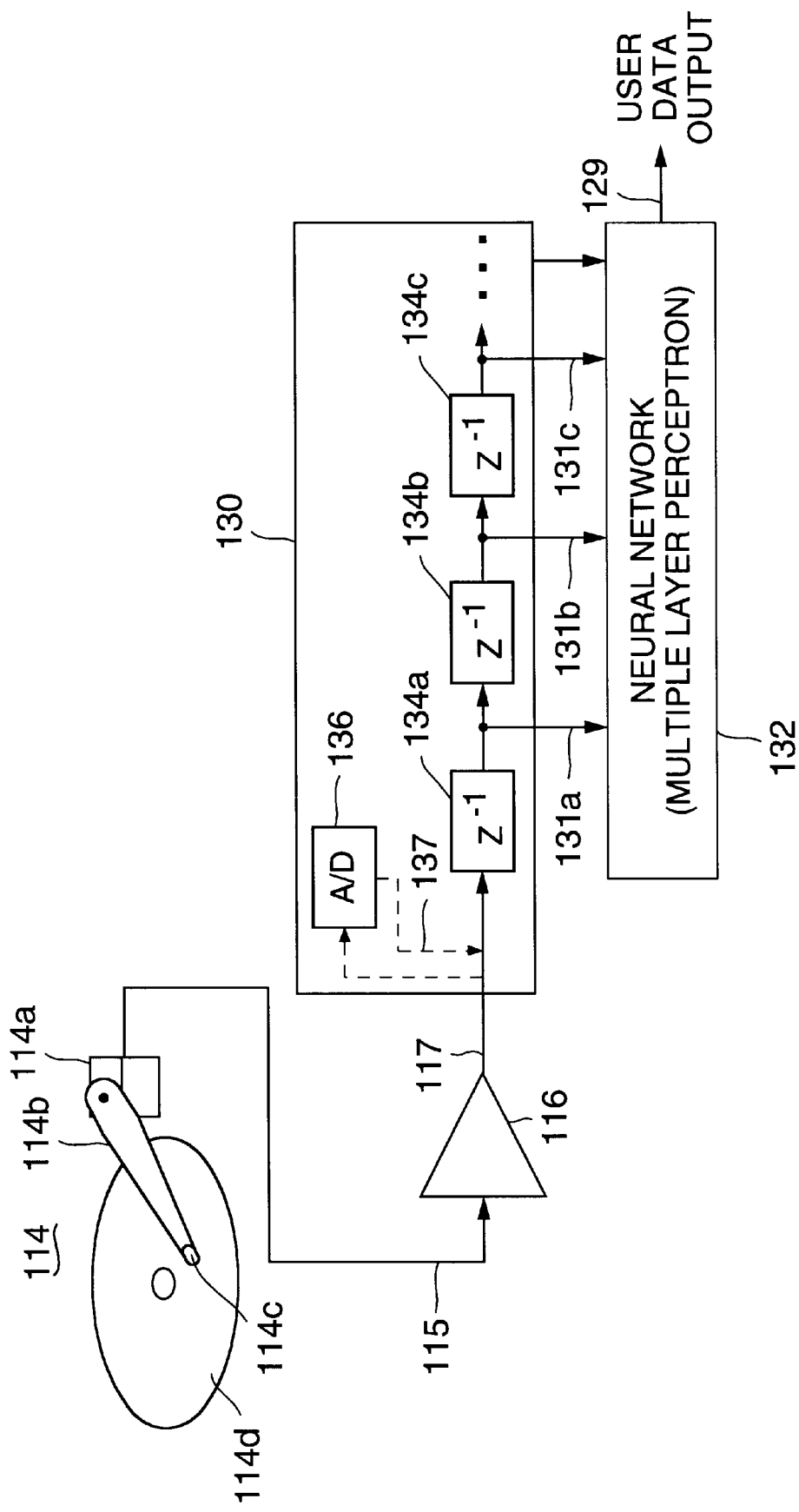
FIG. 2 is a functional block diagram of a neural network based read channel signal processor in accordance with one embodiment of the present invention.

Referring to FIG. 2, a neural network based read channel signal processor in accordance with one embodiment of the present invention includes a preprocessor 130 and a neural network (e.g., multiple layer perceptron) 132. An information signal 115 retrieved from a magnetic storage medium (e.g., magnetic disk 114d) is buffered by a buffer amplifier 116. The preprocessor 130 includes a series of unit time delay elements 134 which receive and sequentially time delay the buffered analog signal 117 to produce a series of discrete samples 131 of the input signal 117. In accordance with one embodiment of the present invention, this preprocessor 130 includes a tapped delay line. According to another embodiment, the preprocessor 130 includes an analog-to-digital converter 136 which digitizes the analog input 117 and a shift register with individual register elements 134 which time shift the digitized signal 137 to produce the sample sequence signals 131.

The neural network 132 (discussed in more detail below) receives the sample sequence signals 131 and processes them to produce the user data output 129.

Figure 3:
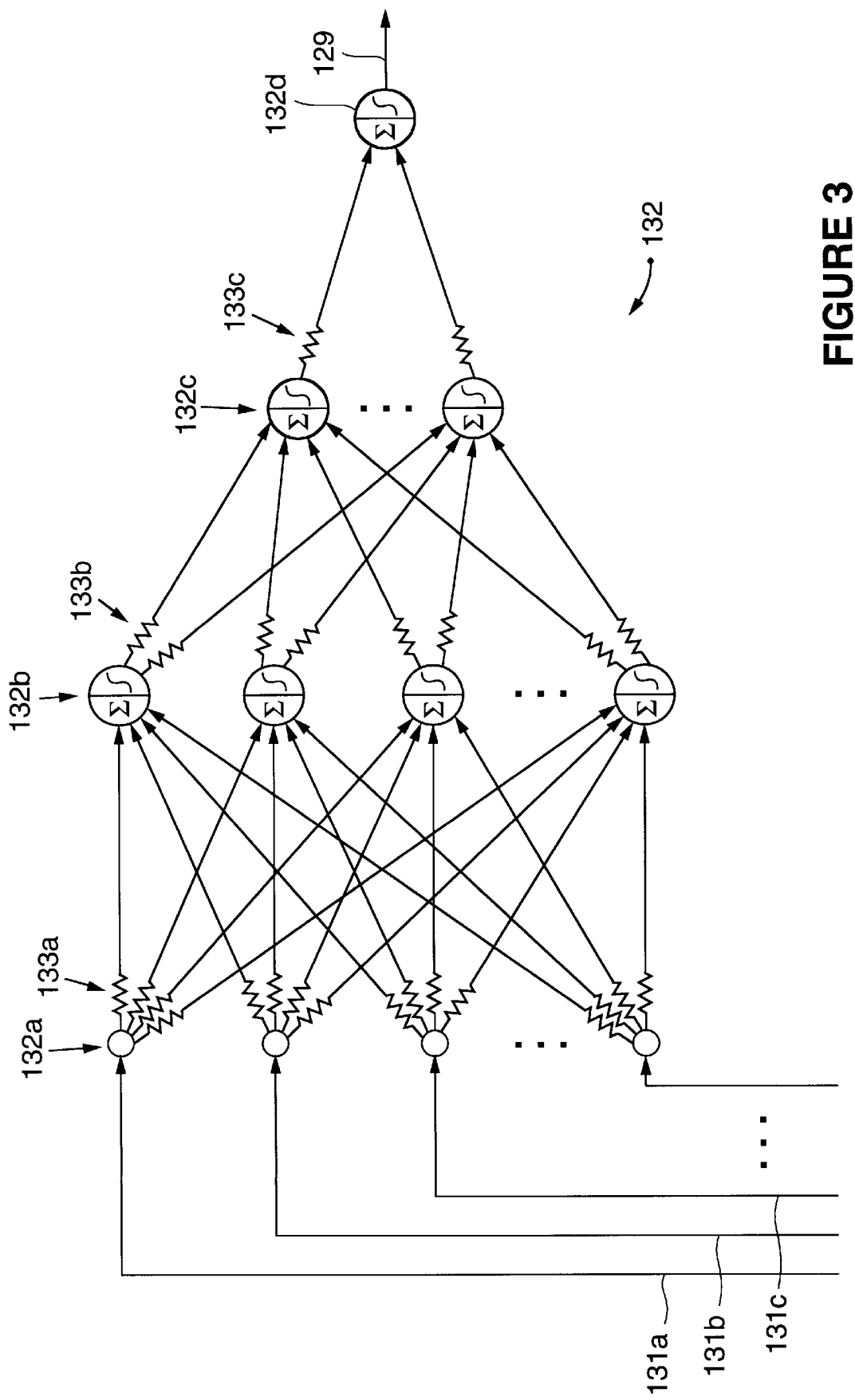
FIG. 3 is a functional block diagram of an example of a multiple layer perceptron suitable for use as the neural network in a neural network based read channel signal processor in accordance with the present invention.

Referring to FIG. 3, an example of a multiple layer perceptron (MLP) suitable for use as the neural network 132 includes an input layer of distribution nodes 132a, two hidden layers of neurons 132b, 132c, and an output layer neuron 132d. In accordance with conventional neural network technology, adjacent layers 132a, 132b, 132c, 132d are fully interconnected via individual interneural weights 133a, 133b, 133c which interconnect the individual nodes and neurons. Each neuron 132b, 132c, 132d performs a summation of its respective weighted inputs followed by a nonlinear function (e.g., sigmoid) to generate its respective output.

Figure 4:
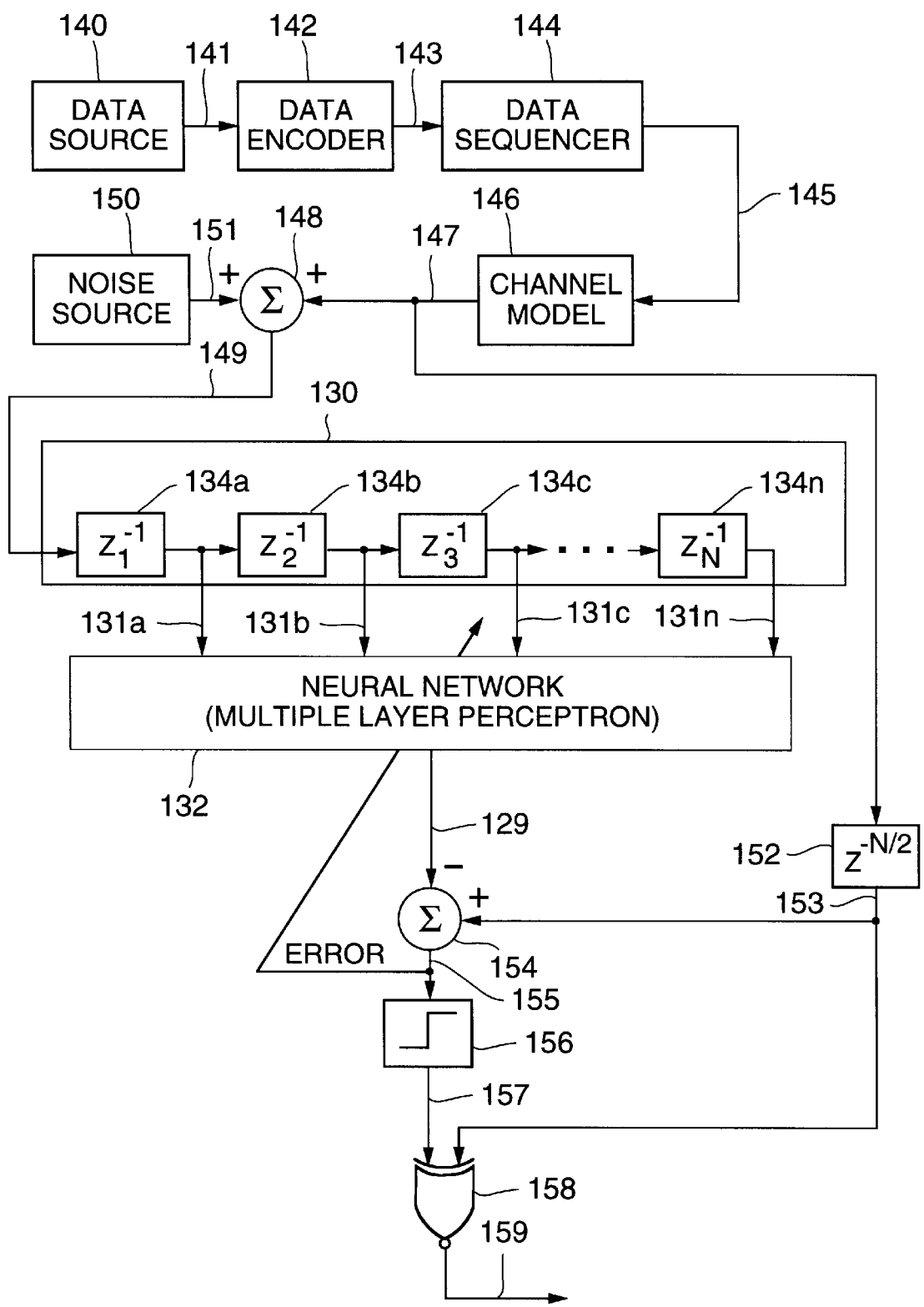
FIG. 4 is a functional block diagram of a system for training a neural network based read channel signal processor in accordance with another embodiment of the present invention.

Referring to FIG. 4, a system configured to train the neural network based signal processor of FIG. 2 can be implemented as shown. A data source 140 provides data 141 which is encoded by a data encoder 142. The encoded data 143 is converted into the appropriate data symbol sequence (e.g., −1/+1) by a data sequencer 144. The resulting data symbol sequence 145 is passed through a channel model 146 which is configured to emulate both the write and read channels of a device for storing and retrieving data on a magnetic storage medium. Its output signal 147, which emulates information signals retrieved from a magnetic storage medium, is summed together in a signal combiner 148 with uncorrelated (e.g., white gaussian) noise 151 provided by a noise source 150. The resulting combined signal 149 is received by and sequentially delayed by the unit time delay elements 134 within the preprocessor 130. The sample sequence signals 131 are processed by the neural network 132 to provide the data output signal 129.

The information signal 147 from the channel model 146 is also received by another time delay element 152 which delays such signal 147 by a number N/2 of unit time delays which is equal to one-half of the number N of unit time delays within the preprocessor 130. This number N/2 of unit time delays is equal to one-half of the number of unit time delays used within the preprocessor 130 so as to provide an auxiliary time delayed information signal 153 which represents data within the middle of the time window established by the unit time delay elements 134 within the preprocessor 130.

This auxiliary delayed signal 153 is differentially summed within a signal combiner 154 with the output 129 from the neural network 132. The resulting difference signal 155 represents the error between the actual output 129 of the neural network 122 and that which is desired as based upon the input 149 to the preprocessor 130. This error information as represented by the error signal 155 is back propagated through the neural network 132 to appropriately adjust the interneural weights 133a, 133b, 133c (FIG. 3) in accordance with conventional well known back propagation techniques. This process is repeated with appropriate training data from the data source 140 until the error within the output 129 from the neural network 132, as represented by the difference signal 155, is within the desired limits.

The error signal 155 can also be received and processed by a threshold circuit 156 to produce a digital output 157 for comparison with the auxiliary time delayed information signal 153 in an exclusive-OR gate 158. This output 159 represents the bit error rate (BER) of the read channel.

Figure 5:
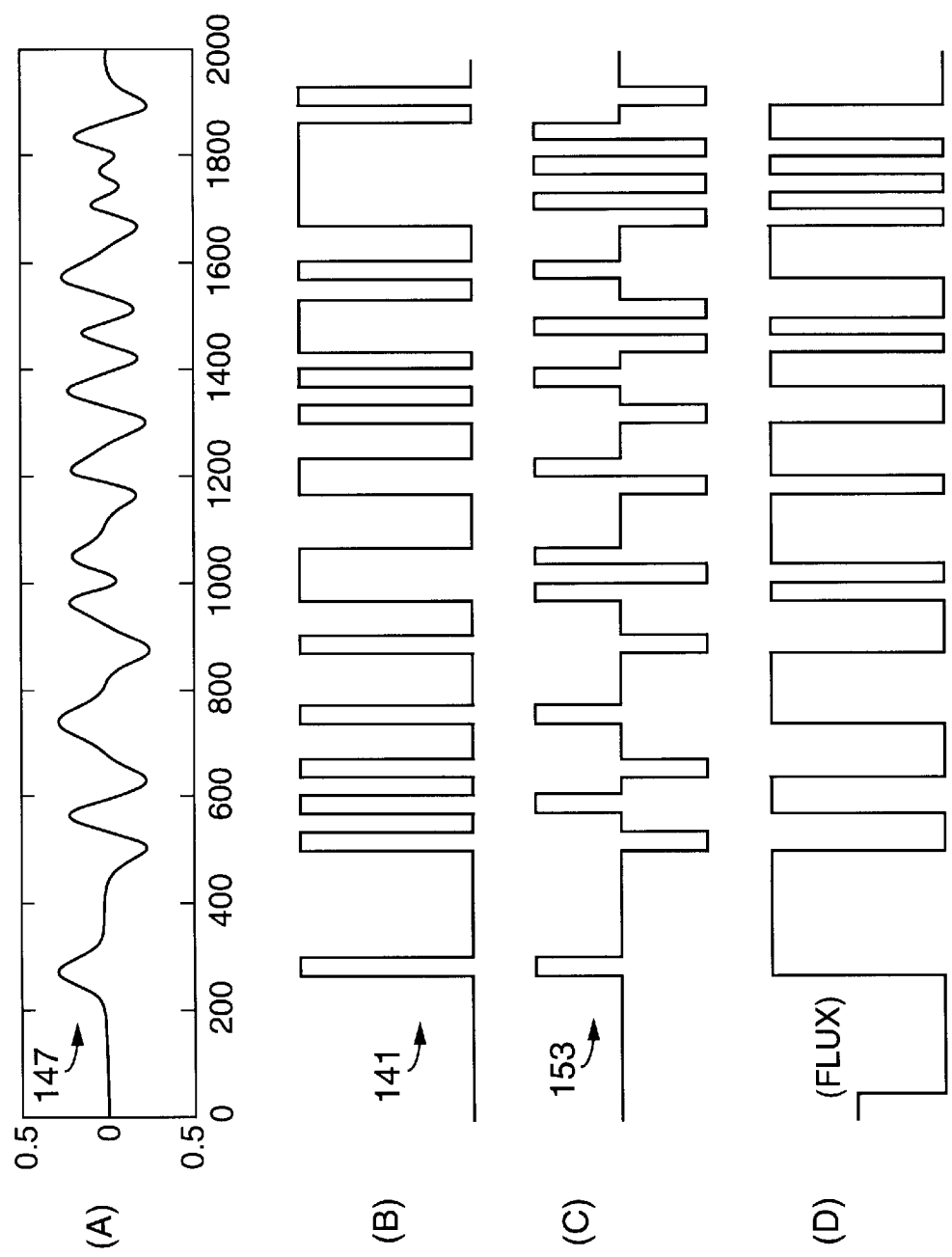
FIG. 5 illustrates example signal waveforms for various signals within the system of FIG. 4.

Referring to FIG. 5, the waveforms shown represent selected signals within the training system of FIG. 4. Waveform A represents an example of an information signal 147 provided by the channel model 146 prior to its summation with the uncorrelated noise 151. Waveform B represents the data 141 from the data source 140. Waveform C represents the time delayed information signal 153 used in establishing the error signal 155. Waveform D represents the flux polarity within the magnetic storage medium modeled (e.g., theoretically or empirically) by the channel model 146.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A neural network system which includes a neural network based signal processor and is configured to train said neural network based signal processor for symbol sequencing detection, equalization and decoding of information signals retrieved from a magnetic storage medium, said neural network system comprising:

a data source configured to provide a first plurality of data which includes encoding and symbol sequencing;

a magnetic storage medium model, coupled to said data source and representing a reference magnetic storage medium, configured to receive and process said first plurality of data and in accordance therewith provide a first data signal which represents said first plurality of data, wherein said first data signal includes said encoding, said symbol sequencing and a plurality of nonlinearities, and wherein said plurality of nonlinearities corresponds to an originating of said first data signal from said reference magnetic storage medium;

an additive noise source, coupled to said magnetic storage medium model, configured to receive said first data signal and add noise thereto and in accordance therewith provide a second data signal, wherein said second data signal includes said encoding, said symbol sequencing, said plurality of nonlinearities and said added noise;

a neural network signal processor, coupled to said additive noise source, configured to receive and back propagate an error signal and in accordance therewith receive and perform symbol sequencing detection, equalization and decoding upon said second data signal and in accordance therewith provide a third data signal, wherein said third data signal represents a second plurality of data which corresponds to said first plurality of data with said symbol sequencing detected, said encoding decoded, said plurality of nonlinearities substantially equalized and said added noise substantially removed; and an error detection circuit, coupled to said magnetic storage medium model and said neural network signal processor, configured to receive and process said first and third data signals and in accordance therewith provide said error signal.

2. The neural network system of claim 1, wherein said neural network signal processor comprises:

a preprocessor configured to receive said second data signal and in accordance therewith provide a plurality of temporally related signals; and a neural network, coupled to said preprocessor, configured to receive and back propagate said error signal and in accordance therewith receive and perform symbol sequencing detection, equalization and decoding upon said second data signal by receiving and processing said plurality of temporally related signals together simultaneously and in accordance therewith provide said third data signal.

3. The neural network system of claim 2, wherein said preprocessor comprises a tapped delay line configured to receive and sequentially time delay said second data signal and in accordance therewith provide a plurality of sequentially time delayed signals as said plurality of temporally related signals.

4. The neural network system of claim 2, wherein said preprocessor comprises a shift register configured to receive and selectively shift said second data signal and in accordance therewith provide a plurality of sequentially time shifted signals as said plurality of temporally related signals.

5. The neural network system of claim 2, wherein said neural network comprises a multiple layer perceptron which includes a plurality of inputs configured to receive said plurality of temporally related signals and an output configured to provide said third data signal.

6. The neural network system of claim 1, wherein said neural network signal processor comprises a multiple layer perceptron.

7. The neural network system of claim 1, wherein said error detection circuit comprises:

a signal delay circuit, coupled to said magnetic storage medium model, configured to receive and delay said first data signal and in accordance therewith provide a fourth data signal; and a signal combiner, coupled to said signal delay circuit and said neural network signal processor, configured to receive and combine said third and fourth data signals and in accordance therewith provide said error signal.

8. A method of training a neural network based signal processor for symbol sequencing detection, equalization and decoding of information signals retrieved from a magnetic storage medium, said method comprising the steps of:

generating a first plurality of data which includes encoding and symbol sequencing;

processing, in accordance with a magnetic storage medium model which represents a reference magnetic storage medium, said first plurality of data and in accordance therewith generating a first data signal which represents said first plurality of data, wherein said first data signal includes said encoding, said symbol sequencing and a plurality of nonlinearities, and wherein said plurality of nonlinearities corresponds to an originating of said first data signal from said reference magnetic storage medium;

adding noise to said first data signal and in accordance therewith generating a second data signal, wherein said second data signal includes said encoding, said symbol sequencing, said plurality of nonlinearities and said added noise;

receiving and back propagating an error signal and in accordance therewith performing symbol sequencing detection, equalization and decoding upon said second data signal and in accordance therewith generating a third data signal with a neural network signal processor, wherein said third data signal represents a second plurality of data which corresponds to said first plurality of data with said symbol sequencing detected, said encoding decoded, said plurality of nonlinearities substantially equalized and said added noise substantially removed; and processing said first and third data signals and in accordance therewith generating said error signal.

9. The method of claim 8, wherein said step of receiving and back propagating an error signal and in accordance therewith performing symbol sequencing detection, equalization and decoding upon said second data signal and in accordance therewith generating a third data signal with a neural network signal processor comprises:

generating a plurality of temporally related signals in accordance with said second data signal; and receiving and back propagating said error signal and in accordance therewith performing symbol sequencing detection, equalization and decoding upon said second data signal by receiving and processing said plurality of temporally related signals together simultaneously and in accordance therewith generating said third data signal with a neural network.

10. The method of claim 9, wherein said step of generating a plurality of temporally related signals in accordance with said second data signal comprises sequentially time delaying said second data signal with a tapped delay line and in accordance therewith generating a plurality of sequentially time delayed signals as said plurality of temporally related signals.

11. The method of claim 9, wherein said step of generating a plurality of temporally related signals in accordance with said second data signal comprises selectively shifting said second data signal with a shift register and in accordance therewith generating a plurality of sequentially time shifted signals as said plurality of temporally related signals.

12. The method of claim 9, wherein said step of receiving and back propagating said error signal and in accordance therewith performing symbol sequencing detection, equalization and decoding upon said second data signal by receiving and processing said plurality of temporally related signals together simultaneously and in accordance therewith generating said third data signal with a neural network comprises receiving and back propagating said error signal via an output of a multiple layer perceptron and in accordance therewith processing said plurality of temporally related signals together simultaneously via a plurality of inputs to said multiple layer perceptron and in accordance therewith generating said third data signal.

13. The method of claim 8, wherein said step of receiving and back propagating an error signal and in accordance therewith performing symbol sequencing detection, equalization and decoding upon said second data signal and in accordance therewith generating a third data signal with a neural network signal processor comprises receiving and back propagating said error signal and in accordance therewith performing symbol sequencing detection, equalization and decoding upon said second data signal and in accordance therewith generating said third data signal with a multiple layer perceptron.

14. The method of claim 8, wherein said step of processing said first and third data signals and in accordance therewith generating said error signal comprises:

delaying said first data signal and in accordance therewith generating a fourth data signal; and combining said third and fourth data signals and in accordance therewith generating said error signal.

\* \* \* \* \*